United States Patent
Choi et al.

(10) Patent No.: US 10,316,185 B2
(45) Date of Patent: Jun. 11, 2019

(54) POLYCARBONATE RESIN COMPOSITION AND MOLDED PRODUCT COMPRISING SAME

(71) Applicant: LOTTE ADVANCED MATERIALS CO., LTD., Yeosu-si (KR)

(72) Inventors: Ki Hong Choi, Uiwang-si (KR); Seung Shik Shin, Uiwang-si (KR); Kyuong Sik Chin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 50 days.

(21) Appl. No.: 15/533,045

(22) PCT Filed: Dec. 28, 2015

(86) PCT No.: PCT/KR2015/014329
§ 371 (c)(1),
(2) Date: Jun. 5, 2017

(87) PCT Pub. No.: WO2016/108539
PCT Pub. Date: Jul. 7, 2016

(65) Prior Publication Data
US 2017/0342262 A1  Nov. 30, 2017

(30) Foreign Application Priority Data

Dec. 31, 2014  (KR) .................. 10-2014-0195804
Dec. 21, 2015  (KR) .................. 10-2015-0183279

(51) Int. Cl.

| | |
|---|---|
| *C08L 69/00* | (2006.01) |
| *C08L 91/06* | (2006.01) |
| *C08L 23/08* | (2006.01) |
| *C08K 3/34* | (2006.01) |
| *C08K 7/00* | (2006.01) |
| *C08L 55/02* | (2006.01) |
| *C08K 3/013* | (2018.01) |

(52) U.S. Cl.
CPC .............. *C08L 69/00* (2013.01); *C08K 3/013* (2018.01); *C08K 3/34* (2013.01); *C08K 7/00* (2013.01); *C08L 23/0869* (2013.01); *C08L 55/02* (2013.01); *C08L 91/06* (2013.01); *C08L 2205/03* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 6,465,555 B1 * | 10/2002 | Nodera .................... | C08K 3/02 524/111 |
| 9,056,978 B2 | 6/2015 | Son et al. | |
| 2003/0004251 A1 | 1/2003 | Hashimoto et al. | |
| 2004/0063824 A1 * | 4/2004 | Takagi ................... | C08K 5/523 524/115 |
| 2005/0038145 A1 | 2/2005 | Gallucci et al. | |
| 2005/0131105 A1 | 6/2005 | Choate et al. | |
| 2006/0084748 A1 | 4/2006 | Gallucci et al. | |
| 2007/0179234 A1 | 8/2007 | Choate et al. | |
| 2012/0022190 A1 * | 1/2012 | Nagano ................... | C08L 67/02 524/114 |
| 2012/0100377 A1 | 4/2012 | Seidel et al. | |
| 2016/0160044 A1 * | 6/2016 | Kanaya ................... | C08L 67/00 523/351 |
| 2016/0280910 A1 * | 9/2016 | Erkelenz ................ | C08L 69/00 |

FOREIGN PATENT DOCUMENTS

| | | |
|---|---|---|
| CN | 101367990 A | 2/2009 |
| EP | 1300445 A1 | 4/2003 |
| JP | 2002-146176 A | 5/2002 |
| JP | 2003-301105 A | 10/2003 |
| JP | 2007-070468 A | 3/2007 |
| KR | 10-0885653 B1 | 2/2009 |
| KR | 2011-0059886 A | 6/2011 |
| WO | 2013/115538 A1 | 8/2013 |
| WO | 2016/108539 A1 | 7/2016 |

OTHER PUBLICATIONS

International Search Report in counterpart International Application No. PCT/KR2015/014329, dated Apr. 6, 2016, pp. 1-4.
Search Report in counterpart European Application No. 15875633.8 dated Jul. 18, 2018, pp. 1-6.

* cited by examiner

*Primary Examiner* — David J Buttner
(74) *Attorney, Agent, or Firm* — Additon, Higgins & Pendleton, P.A.

(57) ABSTRACT

Disclosed herein is a polycarbonate resin composition. The polycarbonate resin composition includes a polycarbonate resin, inorganic fillers, an impact modifier comprising a modified olefin-based copolymer, and olefin wax containing a reactive group comprising at least one of a carboxylic acid group, a carboxylic acid anhydride group, an epoxy group, and a glycidyl group, wherein the inorganic fillers comprise flake-type fillers and needle-like fillers. The polycarbonate resin composition has excellent properties in terms of appearance, mechanical properties, and dimensional stability.

11 Claims, No Drawings

POLYCARBONATE RESIN COMPOSITION AND MOLDED PRODUCT COMPRISING SAME

CROSS-REFERENCE TO RELATED APPLICATIONS

This application claims priority to and the benefit of International Application No. PCT/KR2015/014329, filed Dec. 28, 2015, which published as WO 2016/108539 on Jul. 7, 2016; Korean Patent Application No. 10-2014-0195804, filed in the Korean Intellectual Property Office on Dec. 31, 2014; and Korean Patent Application No. 10-2015-0183279, filed in the Korean Intellectual Property Office on Dec. 21, 2015, the entire disclosure of each of which is incorporated herein by reference.

TECHNICAL FIELD

The present invention relates to a polycarbonate resin composition and a molded article including the same. More particularly, the present invention relates to a polycarbonate resin composition which has excellent properties in terms of appearance, mechanical properties, and dimensional stability.

BACKGROUND ART

Polycarbonate resins are engineering plastics which have excellent properties in terms of impact resistance, heat resistance, dimensional stability, weatherability, chemical resistance, electrical properties, transparency, and the like. Typically, blends of thermoplastic resins such as polycarbonate resins and inorganic fillers are widely used for molded articles requiring high rigidity, for example, interior/exterior materials for automobiles and electric/electronic products.

However, when inorganic fillers such as glass fibers are blended with a polycarbonate resin, fluidity (moldability) and impact resistance of the resin composition can be deteriorated, and the inorganic fillers can protrude from a surface of a molded article, thereby causing deterioration in appearance characteristics. Particularly, when such a resin composition (blend) is used as exterior materials for IT equipment in which appearance characteristics are important, protrusion of the inorganic fillers has been recognized as a major appearance issue. Moreover, upon injection molding of the resin composition, distortion can occur due to anisotropy of the inorganic fillers. Accordingly, there has been an attempt to use flake-type talc capable of solving the problem of anisotropy as inorganic fillers.

However, since mechanical properties such as impact resistance (Izod impact strength) of a resin composition can be deteriorated due to brittleness of talc, there is a limitation in using talc as an exterior material. Further, a blend (resin composition) of a thermoplastic resin such as a polycarbonate resin and inorganic fillers can suffer from warpage upon injection molding depending upon the type and shape of the inorganic fillers and can have poor impact resistance despite improved rigidity and dimensional stability.

Therefore, there is a need for a polycarbonate resin composition which has excellent properties in terms of appearance, mechanical properties, and dimensional stability.

The background technique of the present invention is disclosed in Korean Patent Publication No. 2011-0059886 and the like.

DISCLOSURE

Technical Problem

It is one aspect of the present invention to provide a polycarbonate resin composition which has excellent properties in terms of appearance, mechanical properties and dimensional stability.

It is another aspect of the present invention to provide a molded article formed of the polycarbonate resin composition as set forth above.

These and other objects of the present invention can be achieved by embodiments of the present invention described below.

Technical Solution

One aspect of the present invention relates to a polycarbonate resin composition. The polycarbonate resin composition includes: a polycarbonate resin; inorganic fillers; an impact modifier including a modified olefin-based copolymer; and an olefin wax containing a reactive group including at least one of a carboxylic acid group, a carboxylic acid anhydride group, an epoxy group, and a glycidyl group, wherein the inorganic fillers include flake-type fillers and needle-like fillers.

In one embodiment, the inorganic fillers may be present in an amount of about 5 parts by weight to about 30 parts by weight relative to about 100 parts by weight of the polycarbonate resin; the impact modifier may be present in an amount of about 1 part by weight to about 10 parts by weight relative to about 100 parts by weight of the polycarbonate resin; and the reactive group-containing olefin wax may be present in an amount of about 0.1 parts by weight to about 1.0 part by weight relative to about 100 parts by weight of the polycarbonate resin.

In one embodiment, the flake-type fillers may include talc, mica, or a mixture thereof and the needle-like fillers may include wollastonite, whiskers, glass fibers, basalt fibers, or a mixture thereof.

In one embodiment, the flake-type fillers may be present in an amount of about 1 wt % to about 99 wt % based on the total weight of the inorganic fillers and the needle-like fillers may be present in an amount of about 1 wt % to about 99 wt % based on the total weight of the inorganic fillers.

In one embodiment, a weight ratio of the flake-type fillers to the needle-like fillers ranges from about 1:0.5 to about 1:2.

In one embodiment, the flake-type fillers may have an average thickness of about 30 nm to about 700 nm, an average particle size of about 0.65 µm to about 5.0 µm, and a ratio of average diameter to average thickness (diameter/thickness) of about 4 to about 30, and the needle-like fillers may have an average diameter D of about 0.01 µm to about 15 µm, an average length L of about 3 µm to about 3,000 µm, and a ratio of average length to average diameter (L/D) of about 10 to about 200.

In one embodiment, the modified olefin-based copolymer may include at least one selected from among ethylene-methyl acrylate copolymer (EMA), ethylene-ethyl acrylate copolymer (EEA), methyl methacrylate-butadiene-styrene (MBS), styrene-butadiene-styrene (SBS), styrene-butadiene rubber (SBR), ethylene-propylene rubber (EPM, EPR), ethylene-propylene-diene copolymer (EPDM), maleic anhydride-modified EPM (EPM-g-MA), maleic anhydride-modified ester (SBS-g-MA), maleic anhydride-modified EPDM (EPDM-g-MA), and ethylene vinyl alcohol copolymer (EVOH).

In one embodiment, the impact modifier may include the modified olefin-based copolymer and a core-shell graft impact modifier.

In one embodiment, a weight ratio of the modified olefin-based copolymer to the core-shell graft impact modifier may range from about 1:0.1 to about 1:10.

In one embodiment, the reactive group may be present in an amount of about 50 mol % to about 100 mol % in the reactive group-containing olefin wax.

In one embodiment, the reactive group-containing olefin wax may have a weight average molecular weight of about 5,000 g/mol to about 50,000 g/mol.

In one embodiment, the polycarbonate resin composition may further include at least one additive selected from among release agents, flame retardants, flame retardant aids, lubricants, plasticizers, heat stabilizers, dripping inhibitors, antioxidants, light stabilizers, pigments, and dyes.

In one embodiment, the polycarbonate resin composition may have an Izod impact strength of about 13.5 kgf·cm/cm to about 20 kgf·cm/cm, as measured on an about ⅛" thick specimen in accordance with ASTM D256 and a coefficient of linear expansion of about $40 \times 10^{-6}$ cm/cm° C. to about $55 \times 10^{-6}$ cm/cm° C., as measured on an about 6.4 mm flexural specimen at a temperature of about 10° C. to about 90° C. in accordance with ASTM D696.

In one embodiment, the polycarbonate resin composition may have a degree of warpage of about 13.5 mm or less, as measured through a procedure in which three corners of an injection-molded specimen having a size of about 15 cm×about 40 cm×about 15 mm (injection temperature: about 310° C., mold temperature: about 80° C.) are attached to the ground, followed by leaving the specimen at about 23° C. and about 50% RH, and the distance from the ground to the other corner of the specimen is measured.

Another aspect of the present invention relates to a molded article formed of the polycarbonate resin composition as set forth above.

Advantageous Effects

According to the present invention, it is possible to provide a polycarbonate resin composition which has excellent properties in terms of appearance, mechanical properties and dimensional stability, and a molded article formed of the polycarbonate resin composition.

BEST MODE

Hereinafter, embodiments of the present invention will be described in detail.

A polycarbonate resin composition according to the present invention has excellent properties in terms of appearance, mechanical properties and dimensional stability, and includes: a polycarbonate resin; inorganic fillers including flake-type fillers and needle-like fillers; an impact modifier including a modified olefin-based copolymer; and an olefin wax containing a reactive group including at least one of a carboxylic acid group, a carboxylic acid anhydride group, an epoxy group and a glycidyl group.

The polycarbonate resin according to the present invention is a typical thermoplastic polycarbonate resin. For example, the polycarbonate resin may be an aromatic polycarbonate resin prepared by reacting a carbonate precursor such as phosgene, halogen formate, and carbonic diester with diphenols (aromatic diol compounds).

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis(3,5-dichloro-4-hydroxyphenyl)propane, without being limited thereto. For example, the diphenols may be 2,2-bis(4-hydroxyphenyl)propane, 2,2-bis(3,5-dichloro-4-hydroxyphenyl)propane, or 1,1-bis(4-hydroxyphenyl)cyclohexane, specifically 2,2-bis-(4-hydroxyphenyl)-propane, which is also referred to as bisphenol A.

The polycarbonate resin may be a branched polycarbonate resin. For example, the polycarbonate resin may be a polycarbonate resin prepared by adding a tri- or higher polyfunctional compound, specifically a tri- or higher valent phenol group-containing compound in an amount of about 0.05 mol % to 2 mol % based on the total moles of the diphenols used in polymerization.

The polycarbonate resin may be a homopolycarbonate resin, a copolycarbonate resin, or a blend thereof.

In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 100,000 g/mol, for example, about 15,000 g/mol to about 40,000 g/mol, as measured by gel permeation chromatography (GPC), without being limited thereto.

The inorganic fillers according to the present invention include both flake-type fillers and needle-like fillers. Examples of the flake-type fillers may include talc, mica, and mixtures thereof, for example, talc, and examples of the needle-like fillers may include wollastonite, whiskers, glass fibers, basalt fibers, and mixtures thereof, for example, wollastonite or whiskers, without being limited thereto.

In some embodiments, the flake-type fillers may be present in the form of a thin film having a Z-axis length (thickness) smaller than X-axis and Y-axis lengths (expressing the cross-sectional area), and may have an average thickness of about 30 nm to about 700 nm, for example, about 30 nm to about 300 nm and a ratio of average diameter (X-axis average length or Y-axis average length) to average thickness (Z-axis length) (aspect ratio, diameter/thickness) of about 4 to about 30, for example, about 10 to about 30. Stiffness of the flake-type fillers can be further improved with increasing ratio of average diameter to average thickness. In addition, the flake-type fillers may have an average particle size of about 0.65 µm to about 5.0 µm, for example, about 0.65 µm to about 2.7 µm, specifically about 0.8 µm to about 2.5 µm. Here, the average particle size of the flake-type fillers refers to the median particle size distribution measured by the X-ray transmission method. Specifically, the particle size distribution of the flake-type fillers may be obtained by passing X-rays through sediment particles, followed by calculating the median particle size distribution.

In some embodiments, the needle-like fillers have a needle-like (fibrous) shape and may have an average diameter (D) of about 0.01 µm to about 15 µm, for example, about 0.03 µm to about 13 µm, an average length (L) of about 3 µm to about 3,000 µm, for example, about 5 µm to about 2,600 µm, and a ratio of average length to average diameter (aspect ratio, L/D) of about 10 to about 200, for example, about 20 to about 150. Within these ranges, when the flake-type fillers are mixed with the needle-like fillers, improvement in stiffness and direction-dependent shrinkage stability can be achieved.

In some embodiments, the flake-type fillers may be present in an amount of about 1 wt % to about 99 wt %, for example, about 10 wt % to about 70 wt %, specifically about 10 wt % to about 60 wt %, based on the total weight of the inorganic fillers, and the needle-like fillers may be present in an amount of about 1 wt % to about 99 wt %, for example, about 30 wt % to about 90 wt %, specifically about 40 wt % to about 90 wt %, based on the total weight of the inorganic fillers. Within these ranges, the polycarbonate resin composition can have excellent impact resistance and stiffness.

In some embodiments, a weight ratio of the flake-type fillers to the needle-like fillers may range from about 1:0.5 to about 1:2, for example, about 1:0.9 to about 1:2. Within this range, the polycarbonate resin composition can exhibit further improved impact resistance and stiffness.

Mixing the flake-type fillers with the needle-like fillers may be confirmed by analysis of the polycarbonate resin composition (in pellet form) using a transmission electron microscope and a scanning electron microscope. The pellet may be cut into various shapes, for example, a circular shape, an elliptical shape, or a rod shape, and observed through a transmission electron microscope to confirm the shape of flake-type fillers. For needle-like fillers having a relatively large length/diameter ratio, a tensile specimen may be cut and observed using a scanning electron microscope, thereby confirming the presence of the needle-like fillers.

In some embodiments, the inorganic fillers may be present in an amount of about 5 parts by weight to about 30 parts by weight, for example, about 10 parts by weight to about 20 parts by weight relative to about 100 parts by weight of the polycarbonate resin. Within this range, the polycarbonate resin composition can exhibit excellent properties in terms of appearance, mechanical properties and dimensional stability.

The impact modifier according to the present invention includes a modified olefin-based copolymer. As the impact modifier, the modified olefin-based copolymer may be used alone, or a mixture of the modified olefin-based copolymer and a core-shell graft impact modifier may be used.

In some embodiments, the modified olefin-based copolymer can enhance ductility of the polycarbonate resin (matrix) to improve impact resistance of the resin composition and may include ethylene-methyl acrylate copolymer (EMA), ethylene-ethyl acrylate copolymer (EEA), methyl methacrylate-butadiene-styrene (MBS), styrene-butadiene-styrene (SBS), styrene-butadiene rubber (SBR), ethylene-propylene rubber (EPM, EPR), ethylene-propylene-diene copolymer (EPDM), maleic anhydride-modified EPM (EPM-g-MA), maleic anhydride-modified ester (SBS-g-MA), maleic anhydride-modified EPDM (EPDM-g-MA), ethylene vinyl alcohol copolymer (EVOH), and mixtures thereof.

In some embodiments, the core-shell graft impact modifier may be any typical core-shell graft impact modifier. For example, the core-shell graft impact modifier may be prepared by graft-copolymerizing a rubbery polymer core with an unsaturated compound including an aromatic vinyl monomer and at least one monomer copolymerizable with the aromatic vinyl monomer.

Examples of the rubbery polymer (core) may include: diene rubbers such as polybutadiene, poly(styrene-butadiene), and poly(acrylonitrile-butadiene); saturated rubbers obtained by hydrogenating the diene rubbers; acrylic rubbers such as isoprene rubbers and polybutyl acrylate; and ethylene-propylene-diene terpolymer (EPDM). Preferably, the rubbery polymer includes diene rubbers, more preferably butadiene rubbers. The rubbery polymer may be present in an amount of about 5 wt % to about 65 wt %, for example, about 10 wt % to about 60 wt %, specifically about 20 wt % to about 50 wt %, based on the total weight of the core-shell graft impact modifier (core-shell graft copolymer resin). Within this range, the resin composition can have excellent impact strength. The rubbery polymer (rubber particles) may have an average particle size (Z-average) of about 0.05 µm to about 6 µm, for example, about 0.15 µm to about 4 µm, specifically about 0.25 µm to about 3.5 µm. Within this range, the resin composition can have excellent impact strength and appearance characteristics.

The aromatic vinyl monomer is graft-copolymerizable with the rubbery copolymer and may include, for example, styrene, α-methylstyrene, β-methylstyrene, p-methylstyrene, p-t-butylstyrene, ethylstyrene, vinyl xylene, monochlorostyrene, dichlorostyrene, dibromostyrene, and vinylnaphthalene, without being limited thereto. Specifically, the aromatic vinyl monomer may be styrene.

Examples of the monomer copolymerizable with the aromatic vinyl monomer may include unsaturated nitrile compounds such as acrylonitrile, methacrylonitrile, and ethacrylonitrile; acrylic acid; methacrylic acid; maleic anhydride; and N-substituted maleimide, without being limited thereto. These compounds may be used alone or as a mixture thereof.

The unsaturated compound may be present in an amount of about 35 wt % to about 95 wt %, for example, about 40 wt % to about 90 wt %, specifically about 50 wt % to about 80 wt %, based on the total weight of the core-shell graft impact modifier. In addition, when a mixture of the aromatic vinyl monomer and the monomer copolymerizable with the aromatic vinyl monomer is used as the unsaturated compound, the aromatic vinyl monomer may be present in an amount of about 50 wt % to about 95 wt %, for example, about 60 wt % to about 90 wt % based on the total weight of the unsaturated compound and the monomer copolymerizable with the aromatic vinyl monomer may be present in an amount of about 5 wt % to about 50 wt %, for example, about 10 wt % to about 40 wt %. Within this range, the resin composition can have excellent impact strength.

A non-limiting example of the core-shell graft impact modifier may include a copolymer (g-ABS) in which a styrene monomer as an aromatic vinyl compound, and an acrylonitrile monomer as an unsaturated nitrile compound are grafted to a butadiene-based rubbery polymer core to form a shell. The core-shell graft impact modifier may be dispersed in a copolymer of an aromatic vinyl compound and an unsaturated nitrile compound. For example, the core-shell graft impact modifier may be an ABS resin in which g-ABS is dispersed in styrene-acrylonitrile copolymer resin (SAN resin).

In some embodiments, when the core-shell graft impact modifier is used, a weight ratio of the modified olefin-based copolymer to the core-shell graft impact modifier may range from about 1:0.1 to about 1:10, for example, about 1:0.4 to about 1:5. Within this range, the resin composition can exhibit good properties in terms of appearance and impact strength.

In some embodiments, the impact modifier may be present in an amount of about 1 part by weight to about 10 parts by weight, for example, about 2 parts by weight to about 8 parts by weight, relative to about 100 parts by weight of the polycarbonate resin. Within this range, the polycarbonate resin composition can exhibit excellent properties in terms of appearance, mechanical properties and dimensional stability.

The reactive group-containing olefin wax according to the present invention can improve compatibility between the polycarbonate resin and the inorganic fillers, wherein the reactive group includes at least one of a carboxylic acid group, a carboxylic acid anhydride group, an epoxy group, and a glycidyl group. For example, the reactive group-containing olefin wax may be obtained by polymerizing a monomer containing a reactive group, such as acrylic acid, methacrylic acid, maleic acid, fumaric acid, maleic anhydride and citraconic anhydride, with a $C_{10}$ to $C_{60}$ α-olefin monomer, without being limited thereto.

In some embodiments, the reactive group may be present in an amount of about 50 mol % to about 100 mol %, for example, about 80 mol % to about 90 mol % in the reactive group-containing olefin wax. Within this range, the resin composition can exhibit improved impact strength.

In some embodiments, the reactive group-containing olefin wax may have a weight average molecular weight of about 5,000 g/mol to about 50,000 g/mol, for example, about 10,000 g/mol to about 30,000 g/mol, as measured by gel permeation chromatography (GPC). Within this range, the reactive group-containing olefin wax can increase reactivity between the polycarbonate resin and the inorganic fillers.

In some embodiments, the reactive group-containing olefin wax may be present in an amount of about 0.1 parts by weight to about 1.0 part by weight, for example, about 0.2 parts by weight to about 0.5 parts by weight, relative to about 100 parts by weight of the polycarbonate resin. Within this range, the polycarbonate resin composition can exhibit excellent properties in terms of appearance, mechanical properties and dimensional stability.

The polycarbonate resin composition according to the present invention may further include additives such as release agents, flame retardants, flame retardant aids, lubricants, plasticizers, heat stabilizers, dripping inhibitors, antioxidants, light stabilizers, pigments, and dyes, as needed.

In some embodiments, the additives may include any typical additives used in a polycarbonate resin composition, without limitation. Specifically, the additives may include: release agents such as polyethylene wax, fluorine-containing polymer, silicone oil, metal salts of stearic acid, metal salts of montanic acid, and montanic ester wax; phosphorus flame retardants such as sodium pyrophosphate and resorcinol bis(di-2,6-dimethylphenyl)phosphate; nucleating agents such as clay; antioxidants such as hindered phenol-based compounds; and mixtures thereof, without being limited thereto.

In some embodiments, the additives may be present in an amount of about 0.1 parts by weight to about 10 parts by weight relative to about 100 parts by weight of the polycarbonate resin.

In one embodiment, the polycarbonate resin composition may be prepared in pellet form by mixing the above components, followed by melt extrusion in a typical twin-screw type extruder at about 200° C. to about 280° C., for example, about 250° C. to about 260° C.

In some embodiments, the polycarbonate resin composition may have an Izod impact strength of about 13.5 kgf·cm/cm to about 20 kgf·cm/cm, for example, about 14 kgf·cm/cm to about 18 kgf·cm/cm, as measured on an about ⅛" thick specimen in accordance with ASTM D256.

In some embodiments, the polycarbonate resin composition may have a coefficient of linear expansion of about $40 \times 10^{-6}$ cm/cm° C. to about $55 \times 10^{-6}$ cm/cm° C., for example, about $46 \times 10^{-6}$ cm/cm° C. to about $54 \times 10^{-6}$ cm/cm° C., as measured on an about 6.4 mm thick flexural specimen at a temperature of about 10° C. to about 90° C. in accordance with ASTM D696.

In some embodiments, the polycarbonate resin composition may have a degree of warpage of about 13.5 mm or less, for example, about 10 mm to about 13.3 mm, as measured through a procedure in which three corners of an injection-molded specimen having a size of about 15 cm×about 40 cm×about 15 mm (injection temperature: about 310° C., mold temperature: about 80° C.) are attached to the ground, followed by leaving the specimen at about 23° C. and about 50% RH, and the distance from the ground to the other corner of the specimen is measured.

In some embodiments, the polycarbonate resin composition may have a degree of protrusion of the inorganic fillers from a surface of a specimen of about 0.04 mm or less, as measured on the specimen prepared by injection molding (injection temperature: 280° C., mold temperature: 110° C.) with a high-grade mirror mold (steam-type) having a size of 11 cm×40 cm×1 cm using an optical profiler (NT1100, Veeco Instruments).

In accordance with another aspect of the present invention, a molded article is formed from the polycarbonate resin composition as set forth above. The molded article according to the present invention may be formed from the polycarbonate resin composition through various molding methods such as injection molding, extrusion, vacuum molding, and casting. The molded article has excellent properties in terms of appearance, mechanical properties and dimensional stability, and is thus useful as an interior/exterior material for electric/electronic products, automobiles, and the like, and, particularly, is very useful as a housing for electronic devices (thin exterior material).

MODE FOR INVENTION

Next, the present invention will be described in more detail with reference to some examples. It should be understood that these examples are provided for illustration only and are not to be construed in any way as limiting the present invention.

EXAMPLE

Details of components used in the following Examples and Comparative Examples are as follows:

(A) Polycarbonate Resin

A bisphenol-A polycarbonate resin (melt flow index (MI) (measured at a temperature of 300° C. under a load of 1.2 kg in accordance with ISO 1133): 19±2 g/10 min) was used.

(B) Inorganic Fillers (B1) Talc (KCM-6300C, Koch Co., Ltd) was used as the flake-type fillers.

(B2) Wollastonite (4W, NYCO Minerals, Inc., average length: 5.5 μm, average diameter: 0.05 μm) was used as the needle-like fillers.

(B3) Glass fiber (CS321 EC10-3, KCC GLASS FIBER, average length: 3 mm, average diameter 10 μm) was used as the needle-like fillers.

(C) Impact Modifier (C1) An ethylene-methyl acrylate copolymer (EMA) (Elvaroy AC 1330, DuPont Packaging & Industrial Polymers) was used as the modified olefin-based copolymer.

(C2) G-ABS (CHPC, Samsung SDI) was used as the core-shell graft impact modifier.

(D) Reactive Group-Containing Olefin Wax

A copolymer of maleic anhydride and α-olefin, MAH wax (Diacarna-30M, Mitsubishi chemical) was used.

Examples 1 to 2 and Comparative Examples 1 to 11

The above components were added in amounts as listed in Tables 1 and 2, followed by extrusion at 250° C., thereby preparing pellets. Here, extrusion was performed using a twin-screw type extruder (L/D: 36, diameter: 45 mm). The prepared pellets were dried at 80° C. to 100° C. for 4 hours or more, followed by injection molding using a 6 oz. injection machine (molding temperature: 280° C., mold temperature: 60° C.), thereby preparing a specimen. The prepared specimen was evaluated as to the following properties, and results are shown in Tables 1 and 2.

Property Evaluation (1) Izod impact strength (unit: kgf·cm/cm): Izod impact strength was measured on a ⅛" thick notched Izod specimen in accordance with ASTM D256.

(2) Coefficient of linear expansion (CTE, unit: ×10⁻⁶ cm/cm° C.): Coefficient of linear expansion was measured on a 6.4 mm flexural specimen at 10° C. to 90° C. in accordance with ASTM D696.

(3) Warpage (unit: mm): A degree of warpage was measured through a procedure in which three corners of an injection molded specimen having a size of 15 cm×40 cm×15 mm were attached to the ground, followed by leaving the specimen at 23° C. and 50% RH for 24 hours, and the distance (height) from the ground to the other corner of the specimen was measured.

(4) Appearance (unit: mm): After injection molding (injection temperature: 280° C., mold temperature: 110° C.) was performed with a high-grade mirror mold having a size of 11 cm×40 cm×1 cm to prepare a specimen, the degree (unit: mm) to which the inorganic fillers protruded from a surface of the specimen was measured using an optical profiler (NT1100, Veeco Instruments).

TABLE 1

|  | Example | | Comparative Example | | | | |
| --- | --- | --- | --- | --- | --- | --- | --- |
|  | 1 | 2 | 1 | 2 | 3 | 4 | 5 |
| (A) | 100 | 100 | 100 | 100 | 100 | 100 | 100 |
| (B1) | 8.43 | 8.43 | — | 16.87 | — | 4.82 | 8.43 |
| (B2) | 8.43 | 8.43 | — | — | 16.87 | 12.05 | 8.43 |
| (B3) | — | — | 16.87 | — | — | — | — |
| (C1) | 2.41 | 1.20 | — | — | — | — | — |
| (C2) | 1.20 | 2.41 | 3.61 | 3.61 | 3.61 | 3.61 | 3.61 |
| (D) | 0.24 | 0.24 | — | — | — | — | — |
| Izod impact strength | 14.5 | 14.3 | 14.1 | 7.5 | 10.4 | 9.5 | 8.9 |
| Coefficient of linear expansion | 54 | 49 | 44 | 59 | 47 | 49 | 50 |
| Degree of warpage | 13.1 | 12.7 | 20.9 | 11.2 | 16.7 | 13.9 | 12.5 |
| Appearance (degree of protrusion of inorganic filler (mm)) | 0.02 | 0.02 | 0.09 | 0.01 | 0.04 | 0.03 | 0.02 |

TABLE 2

|  | Comparative Example | | | | | |
| --- | --- | --- | --- | --- | --- | --- |
|  | 6 | 7 | 8 | 9 | 10 | 11 |
| (A) | 100 | 100 | 100 | 100 | 100 | 100 |
| (B1) | 8.43 | 8.43 | 8.43 | 8.43 | 16.87 | — |
| (B2) | 8.43 | 8.43 | 8.43 | 8.43 | — | 16.87 |
| (B3) | — | — | — | — | — | — |
| (C1) | 3.61 | 2.41 | 1.20 | — | 1.20 | 1.20 |
| (C2) | — | 1.20 | 2.41 | 3.61 | 2.41 | 2.41 |
| (D) | — | — | — | 0.24 | 0.24 | 0.24 |
| Izod impact strength | 13.9 | 11.5 | 11.2 | 11.2 | 10.6 | 13.7 |
| Coefficient of linear expansion | 62 | 57 | 52 | 51 | 60 | 48 |
| Degree of warpage | 14.5 | 12.9 | 13.3 | 13.2 | 11.5 | 17.1 |
| Appearance (degree of protrusion of inorganic filler (mm)) | 0.02 | 0.02 | 0.02 | 0.02 | 0.01 | 0.04 |

As shown in Table 1, it can be seen that the polycarbonate resin according to the present invention was excellent in terms of mechanical properties such as impact resistance, dimensional stability (coefficient of linear expansion and degree of warpage) and appearance characteristics.

Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

The invention claimed is:

1. A polycarbonate resin composition, comprising:
   about 100 parts by weight of a polycarbonate resin;
   about 5 parts by weight to about 30 parts by weight of inorganic fillers;
   about 1 part by weight to about 10 parts by weight of an impact modifier comprising a modified olefin-based copolymer and a core-shell graft impact modifier, wherein the modified olefin-based copolymer comprises an ethylene-methyl acrylate copolymer (EMA) and/or an ethylene-ethyl acrylate copolymer (EEA); and
   about 0.1 parts by weight to about 1.0 part by weight of an olefin wax containing a reactive group comprising at least one of a carboxylic acid group, a carboxylic acid anhydride group, an epoxy group, and a glycidyl group,
   wherein the inorganic fillers comprise flake-type fillers and needle-like fillers.

2. The polycarbonate resin composition according to claim 1, wherein the flake-type fillers comprise talc, mica, or a mixture thereof, and the needle-like fillers comprise wollastonite, whiskers, glass fibers, basalt fibers, or a mixture thereof.

3. The polycarbonate resin composition according to claim 1, wherein the flake-type fillers are present in an amount of about 1 wt % to about 99 wt % based on the total weight of the inorganic fillers and the needle-like fillers are present in an amount of about 1 wt % to about 99 wt % based on the total weight of the inorganic fillers.

4. The polycarbonate resin composition according to claim 1, wherein a weight ratio of the flake-type fillers to the needle-like fillers ranges from about 1:0.5 to about 1:2.

5. The polycarbonate resin composition according to claim 1, wherein the flake-type fillers have an average thickness of about 30 nm to about 700 nm, an average particle size of about 0.65 μm to about 5.0 μm, and a ratio of average diameter to average thickness (diameter/thickness) of about 4 to about 30, and the needle-like fillers have an average diameter D of about 0.01 μm to about 15 μm, an average length L of about 3 μm to about 3,000 μm, and a ratio of average length to average diameter (L/D) of about 10 to about 200.

6. The polycarbonate resin composition according to claim 1, wherein a weight ratio of the modified olefin-based copolymer to the core-shell graft impact modifier ranges from about 1:0.1 to about 1:10.

7. The polycarbonate resin composition according to claim 1, wherein the reactive group-containing olefin wax has a weight average molecular weight of about 5,000 g/mol to about 50,000 g/mol.

8. The polycarbonate resin composition according to claim 1, further comprising:
   at least one additive selected from among release agents, flame retardants, flame retardant aids, lubricants, plasticizers, heat stabilizers, dripping inhibitors, antioxidants, light stabilizers, pigments, and dyes.

9. The polycarbonate resin composition according to claim 1, wherein the polycarbonate resin composition has an Izod impact strength of about 13.5 kgf·cm/cm to about 20 kgf·cm/cm, as measured on an about ⅛" thick specimen in accordance with ASTM D256 and a coefficient of linear expansion of about $40 \times 10^{-6}$ cm/cm° C. to about $55 \times 10^{-6}$ cm/cm° C., as measured on an about 6.4 mm flexural specimen at a temperature of about 10° C. to about 90° C. in accordance with ASTM D696.

10. The polycarbonate resin composition according to claim 1, wherein the polycarbonate resin composition has a degree of warpage of about 13.5 mm or less, as measured through a procedure in which three corners of an injection-molded specimen having a size of about 15 cm×about 40 cm×about 15 mm (injection temperature: about 310° C., mold temperature: about 80° C.) are attached to the ground, followed by leaving the specimen at about 23° C. and about 50% RH, and the distance from the ground to the other corner of the specimen is measured.

11. A molded article formed of the polycarbonate resin composition according to claim 1.

* * * * *